US009224135B2

(12) United States Patent
Dale et al.

(10) Patent No.: US 9,224,135 B2
(45) Date of Patent: Dec. 29, 2015

(54) METHOD AND APPARATUS FOR ADAPTIVE CONFIGURATION FOR TRANSLATION OF BUSINESS MESSAGES

(71) Applicant: Elemica, Inc., Exton, PA (US)

(72) Inventors: Paul Dale, Frankfurt (DE); Maarten Koopmans, Frankfurt (DE); Blake Schnorf, Atlanta, GA (US); Markus Fix, Frankfurt (DE); Arun Samuga, Atlanta, GA (US)

(73) Assignee: Elemica, Inc., Wayne, PA (US)

( * ) Notice: Subject to any disclaimer, the term of this patent is extended or adjusted under 35 U.S.C. 154(b) by 0 days.

(21) Appl. No.: 14/558,285

(22) Filed: Dec. 2, 2014

(65) Prior Publication Data

US 2015/0186845 A1  Jul. 2, 2015

Related U.S. Application Data

(63) Continuation-in-part of application No. 14/043,076, filed on Oct. 1, 2013, now Pat. No. 8,904,528.

(60) Provisional application No. 61/808,430, filed on Apr. 4, 2013, provisional application No. 61/792,388, filed on Mar. 15, 2013.

(51) Int. Cl.
*H04L 29/06* (2006.01)
*G06Q 10/10* (2012.01)
(Continued)

(52) U.S. Cl.
CPC .............. *G06Q 10/107* (2013.01); *G06Q 40/04* (2013.01); *H04L 9/3215* (2013.01);
(Continued)

(58) Field of Classification Search
CPC ... H04L 9/3263; H04L 63/0823; H04L 51/04; H04L 63/08; H04L 9/3215; H04L 2463/082
USPC .......................................................... 726/22
See application file for complete search history.

(56) References Cited

U.S. PATENT DOCUMENTS 5,202,977 A  4/1993 Pasetes, Jr. et al.
6,726,094 B1  4/2004 Rantze et al.
(Continued)

FOREIGN PATENT DOCUMENTS

WO  9838585 A1  9/1998
WO  2004072886 A1  8/2004
WO  2006026659 A2  3/2006

OTHER PUBLICATIONS

Shim el al.,"Automatic Generation and Integration of RosettaNet Based on Generic Templates and Components". Proceedings of the 4th IEEE Int'l Workshop on Advanced Issues of E-Commerce and Web-Based Information Systems (WECWIS 2002) 1530-1354/02 2002 IEEE, pp. 1-8.*

(Continued)

*Primary Examiner* — Harunur Rashid
(74) *Attorney, Agent, or Firm* — Panitch Schwarze Belisario & Nadel LLP (57) ABSTRACT

A method of adapting a message translation system includes receiving a message from a sender; selecting a configuration set from a stored plurality of configuration sets based on at least two of: information regarding the sender of the message, information regarding a recipient of the message, and information regarding the message type; processing the message in accordance with information derived from the selected configuration set; identifying an issue with the processing of the message in accordance with information derived from the selected configuration set; determining a resolution for the identified issue with the processing of the message in accordance with information derived from the selected configuration set; updating the selected configuration set based upon the determined resolution; reprocessing the message in accordance with information derived from the updated configuration set; and transmitting the message reprocessed in accordance with information derived from the updated configuration set to a recipient.

15 Claims, 5 Drawing Sheets

(51) Int. Cl.
*G06Q 40/04* (2012.01)
*H04L 9/32* (2006.01)
*H04L 12/58* (2006.01)
*H04L 29/08* (2006.01)

(52) U.S. Cl.
CPC ............. *H04L 9/3263* (2013.01); *H04L 51/04* (2013.01); *H04L 63/0823* (2013.01); *H04L 67/12* (2013.01); *H04L 2463/082* (2013.01)

(56) References Cited

U.S. PATENT DOCUMENTS

| | | | |
|---|---|---|---|
| 7,085,286 B2 | 8/2006 | Dias et al. | |
| 7,117,215 B1 | 10/2006 | Kanchwalla et al. | |
| 7,337,148 B2 | 2/2008 | Xie et al. | |
| 7,509,431 B2 | 3/2009 | Singhal et al. | |
| 7,548,939 B2 | 6/2009 | Kalach et al. | |
| 7,562,041 B2 | 7/2009 | Chehade et al. | |
| 7,639,629 B2 | 12/2009 | Kumar et al. | |
| 7,779,295 B1 | 8/2010 | Shah et al. | |
| 7,836,120 B2 | 11/2010 | Zafar | |
| 7,925,631 B1 | 4/2011 | Thillai et al. | |
| 8,032,552 B2 | 10/2011 | Davies et al. | |
| 8,046,441 B2 | 10/2011 | Banerji et al. | |
| 8,065,657 B2 | 11/2011 | Deimel et al. | |
| 8,145,992 B2 | 3/2012 | Jacquin et al. | |
| 8,290,833 B2 | 10/2012 | Yang et al. | |
| 8,312,148 B2 | 11/2012 | Anthias et al. | |
| 8,800,020 B1 | 8/2014 | Dale et al. | |
| 8,904,528 B2 | 12/2014 | Dale et al. | |
| 2002/0107699 A1 | 8/2002 | Rivera et al. | |
| 2002/0107913 A1* | 8/2002 | Rivera et al. | 709/203 |
| 2002/0161688 A1* | 10/2002 | Stewart et al. | 705/37 |
| 2003/0002526 A1 | 1/2003 | Dias et al. | |
| 2003/0065623 A1 | 4/2003 | Corneil et al. | |
| 2003/0130945 A1 | 7/2003 | Force et al. | |
| 2004/0010714 A1 | 1/2004 | Stewart | |
| 2004/0153359 A1 | 8/2004 | Ho et al. | |
| 2004/0221045 A1 | 11/2004 | Joosten et al. | |
| 2005/0071283 A1 | 3/2005 | Randle et al. | |
| 2006/0059565 A1 | 3/2006 | Green et al. | |
| 2006/0155946 A1 | 7/2006 | Ji | |
| 2007/0143665 A1* | 6/2007 | Machiraju et al. | 715/513 |
| 2008/0120129 A1 | 5/2008 | Seubert et al. | |
| 2008/0120600 A1* | 5/2008 | Deimel et al. | 717/121 |
| 2008/0244088 A1* | 10/2008 | Shorter et al. | 709/238 |
| 2010/0211938 A1 | 8/2010 | Singh et al. | |
| 2010/0269156 A1 | 10/2010 | Hohlfeld et al. | |
| 2012/0158875 A1 | 6/2012 | Almeida | |
| 2013/0080542 A1* | 3/2013 | Peng et al. | 709/206 |
| 2013/0226776 A1 | 8/2013 | Chehade et al. | |
| 2013/0283106 A1 | 10/2013 | King et al. | |
| 2014/0068252 A1 | 3/2014 | Maruti et al. | |
| 2014/0114825 A1 | 4/2014 | Krikorian et al. | |

OTHER PUBLICATIONS

Int'l Preliminary Report on Patentability issued Feb. 19, 2015 in Int'l Application No. PCT/US2014/028904.

IBM, "B2B Integration special features," posted on the Internet at http://www-01.ibm.com/software/in/commerce/b2b/b2b-integration/products/special-features/ (visited Jul. 2013).

IBM Redbooks, "Tracking Payments and Securities with IBM Financial Transaction Manager V2," posted on the Internet at http://www.redbooks.ibm.com/abstracts/tips0963.html (visited Jul. 2013).

Trappey et al, "Building b2b protocols in inter-enterprise process execution," Proceedings of the Fifth Asia Pacific Industrial Engineering and Management Systems Conference, posted on the internet at http://www.apiems.net/archive/apiems2004/pdf/apiems2004_7.3.pdf (2004).

The Oracle Corp., The Java EE 6 Tutorial, vol. 1 (2010).

BEA Systems, "Introducing WebLogic Integration B2B Security," found on the internet at http://docs.oracle.com/cd/E13214_01/wli/docs70/b2bsecur/intro.htm (visited Jul. 2013).

RSSBus, "As2 Connector—Getting Started," found on the internet at http://www.rssbus.com/solutions/as2/gettingstarted.aspx (2013).

ACM Digital Library, "Client certificate and IP address based multi-factor authentication for J2EE web applications," Abstract only, found on the internet at http://dl.acm.org/citation.cfm?id=1321229 (2007).

Williscroft, "Trading Partner Web Certificates," found on the internet at http://www.imc.org/ietf-pkix/old-archive-00/msg01245.html, (Jun. 23, 2000).

Office Action issued Dec. 31, 2013 in U.S. Appl. No. 14/043,076.

Office Action issued May 5, 2014 in U.S. Appl. No. 14/043,076 by DALE.

Office Action issued Apr. 22, 2014 in U.S. Appl. No. 14/181,139 by DALE.

Int'l Search Report and Written Opinion issued Oct. 17, 2014 in Int'l Application No. PCT/US2014/028904.

* cited by examiner

METHOD AND APPARATUS FOR ADAPTIVE CONFIGURATION FOR TRANSLATION OF BUSINESS MESSAGES

CROSS-REFERENCE TO RELATED APPLICATION

This application is a Continuation-in-Part of U.S. patent application Ser. No. 14/043,076, filed Oct. 1, 2013, now U.S. Pat. No. 8,904,528 and claims the benefit under 35 U.S.C. §119(e) of U.S. Provisional Application No. 61/808,430, filed Apr. 4, 2013 and U.S. Provisional Application No. 61/792,388, filed Mar. 15, 2013, the entire disclosures of which are incorporated herein by reference.

BACKGROUND OF THE INVENTION

The present invention relates generally to systems and methods for translation of messages and, more particularly, to debuggable and fixable systems and processes for translating messages between business partners in a supply chain or trading network.

Supply chains involve large numbers of parties, each of whom will generally need to communicate with multiple other parties. Numerous message exchange standards exist to facilitate these supply chain communications, but only certain standards will be supported by the business systems of each party. Mismatches in supported standards may make communications more costly, less efficient, or less accurate, or even lead to an inability to conduct business between the parties.

What is needed is a system and associated methods for efficiently and accurately transmitting messages between trading partners in a trading network without requiring modification to the systems or message exchange formats of the parties.

BRIEF SUMMARY OF THE INVENTION

A system and method are provided for controlling access to resources and facilitating correction of access issues. A two-factor authentication method comprises: receiving a credential associated with a connection request, determining a resource identifier associated with the connection request, identifying a user associated with the resource identifier, determining whether the received credential is valid for the identified user, and, responsive to a determination that the credential is not valid for that user, denying access to resources associated with the resource identifier and communicating information regarding the failure to the identified user.

In another aspect, the present application is preferably directed to a method of adapting a message translation system including receiving a message from a sender; selecting a configuration set from a stored plurality of configuration sets based on at least two of: information regarding the sender of the message, information regarding a recipient of the message, and information regarding the message type; processing the message in accordance with information derived from the selected configuration set; identifying an issue with the processing of the message in accordance with the information derived from the selected configuration set; determining a resolution for the identified issue with the processing of the message in accordance with information derived from the selected configuration set; updating the selected configuration set based upon the determined resolution; reprocessing the message in accordance with information derived from the updated configuration set; and transmitting the message reprocessed in accordance with information derived from the updated configuration set to a recipient.

In a further aspect, a preferred embodiment of the present application is directed to a method of adapting a message translation system including processing a set of messages associated the selected configuration set in accordance with information derived from the updated configuration set; comparing output of processing the set of messages associated with the selected configuration set in accordance with information derived from the updated configuration set with predetermined reference output associated with the set of messages; and responsive to a determination that the output of processing the set of messages and the predetermined reference output match, replacing the selected configuration set with the updated configuration set.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE INVENTION

Certain terminology is used in the following description for convenience only and is not limiting. The words "lower," "bottom," "top" and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals indicate like elements throughout, a preferred message translation system 100 for transmitting messages between network partners is described.

Figure 1:
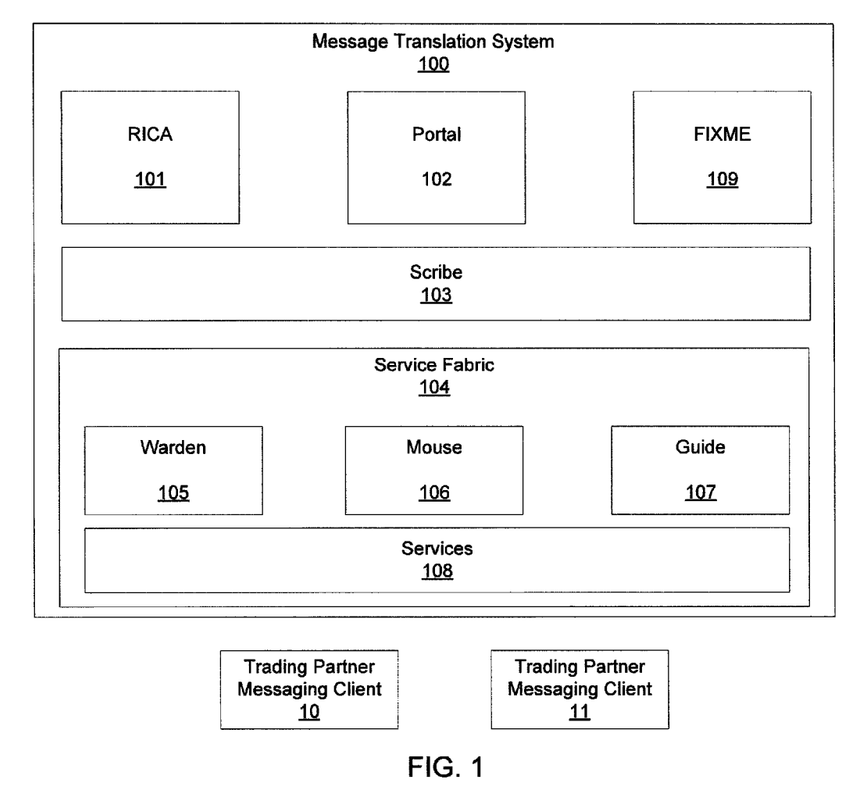
FIG. 1 is an exemplary diagram of a message translation system in accordance with a preferred embodiment of the present invention.

Referring to FIG. 1, message translation system 100 provides for communications between two exemplary trading-partner messaging clients 10 and 11. Messaging clients 10 and 11 may be communications-specific software or message-handling components of other business systems, such as Enterprise Resource Planning (ERP) systems. Message translation system 100 provides, for example, translation of messages from the message exchange format used by messaging client 10 to and from the message exchange format used by messaging client 11.

The message translation system 100 includes an interconnection component, Redundant Interchangeable Connectivity Array (RICA) 101, a user management interface, Portal 102, a data storage and management component, Scribe 103, a message processing system, Service Fabric 104, and an exception handling component, FIXME 109. The Portal 102 preferably includes a management interface for interacting with users at remote locations. RICA 101 provides the interconnection(s) between the network partners and the network for incoming and outgoing data. The Scribe 103 is the data storage and management system. The Service Fabric 104 is preferably configured through the Portal 102, gets input from RICA 101, and uses Scribe 103 for data retrieval and storage. The lower levels of the system 100 are created by the Service Fabric 104 and Scribe 103, integrated by RICA 101, and viewed and configured by the Portal 102. Together, the components create a generalized Process-Semantics-Aware High-Performance data store.

Messages may be any data or information stream related to a process, preferably a business process. The translated messages are generally business messages, for instance, purchase orders, acknowledgments, advance shipping notices, delivery receipts, invoices, or any other messages related to the buying, selling, manufacture, distribution, maintenance, and repair of goods, as well as other operations. In a preferred embodiment, types of messages may include, but are not limited to: Application Advice, Booking Confirmation, Booking Response, Booking Request, Certificate of Analysis, Custom Document, Delivery Receipt, Demand Forecast, Email Outbound, Envelope, Financial Information Report, Forecast, Freight Bill, General Purpose, Goods Receipt, Inventory, Inventory Actual Usage, Invoice, Invoice Adjustment, Load Tender Motor, Load Tender Ocean, Load Tender Response, Lockbox, Ocean Schedule, Order Change, Order Create, Order Response, Organization Relationships, Ownership Transfer Report, Payment Details, Planning Schedule, Product Activity Report, Product Data Message, Product Movement Report, Receipt Notice, Receiving Advice, Self Invoice, Ship Notice, Shipment Information, Shipment Instructions, Shipment Status, Shipping Schedule, and Supply Plan.

Messages are generally received in one of many message exchange formats and translated to another message exchange format selected based upon the capabilities of the receiver. Message formats may include, for example, UN/EDIFACT, ANSI X12, CIDX, PIDX, IDOC, xCBL, EBXML, cXML, GUSI, ODETTE, OAGIS, or other XML formats. Messages may be transmitted to and from the message translation system using a variety of methods such as email, FTP/SFTP, HTTP/HTTPS, SOAP, REST, or an API. Messages may be transmitted completely asynchronously, or a requestor may synchronously wait for a reply, which is created within Service Fabric 104. Other methods for transmitting messages over a network are known to those skilled in the art, and are within the scope of this disclosure.

RICA 101 is a self-service, content-agnostic, multi-protocol messaging broker. RICA 101 decouples the incoming message processing from the protocol used by a networked system to transmit the message. That is, once the message has been received, the method by which it was received is generally no longer considered in its processing. RICA 101 functions as a gateway, offering connections in and out of the message translation system, and comprises an incoming system and an outgoing system.

The incoming system of RICA 101 defines how messages enter the message translation system. Messages enter the system from a networked partner or web/API-enabled partner, are authenticated, and then securely stored before acknowledgement. A two-step authentication process, described further below, is utilized in authenticating the networked partner in order to reduce the friction in troubleshooting connectivity issues for the normally troublesome certificate-based connectivity methods.

The outgoing system of RICA 101 defines how messages destined for recipients leave the message translation system. The outgoing system may receive incoming connections (pull), or it may actively make connections to the receiving client system (push), to deliver messages.

The system has the ability to receive messages via any number of endpoints across a horizontally scalable service. Endpoints are provisioned at run-time. The system may queue messages in an arbitrary number of priority or process-oriented queues. After messages are received via a connected partner they are stored for processing. RICA 101, Scribe 103, and the Portal 102 can be used to assign priority or specific processing characteristics (e.g., "messages from a specific partner must be processed in under 3 minutes").

RICA 101 is preferably an acknowledgment-based system. In operation, a trading partner 10 submits a message to RICA 101, which acknowledges receipt of the message. After RICA 101 receives the message, regardless of the user or protocol type, a process between RICA 101 and Scribe 103 is initiated. RICA 101 transmits an Authorize command to Scribe 103, passing the certificate of the user. Scribe 103 returns a Business Unit result associated with the transmitted certificate. In response, RICA 101 transmits the message to Scribe 103, along with additional information relating to the message. The message is passed from RICA 101 to Scribe 103 by a Put Message command, which is acknowledged to RICA 101 by Scribe 103. Preferably, messages are only acknowledged by RICA 101 to the Networked System after Scribe 103 has acknowledged to RICA 101 so that the system does not accept responsibility for a message until it has been securely persisted. The processed message and a Delivery Book associated with the message are finally returned from Scribe 103 to RICA 101.

Portal 102 includes a user interface accessible to users of the message translation system over a network, such as the Internet or other Wide Area Network. Portal 102 stores and manages data in the Scribe 103 system, and manages configuration information used by RICA 101 and the Service Fabric 104. Generally the message translation system is accessible through a Portal 102 available to service providers (e.g., logistics) and the customer.

Portal 102 includes options for Master Data, configuration, administration, and maintenance of the system, such as provisioning, debug, and enablement of connections. The Master Data area contains relevant business information, including contact information and other relevant details related to business, payments, networks, and processing. The configuration area includes connectivity details for RICA 101 and data enhancement/transformation information for the Service Fabric 104, including how messages are passed in and out of the system. The administration area includes details about the client, as well as related business units, connections with partners, network management, and other details. Maintenance functions include the ability to observe the use of communications, the health of the system, and metrics, such as which messages, and how many messages have been processed by the message translation system.

The system may also contain components for operations, management, and maintenance, of the various components and their connection and use. In a preferred embodiment, an Operations module manages and maintains the systems and their operation. This includes oversight for development of the system, technical support, documentation of systems and process, system administration, and other details related to regular operation and metrics. A supervisor process may also preferably be implemented to monitor the proper functioning of one or more of the other components.

The Service Fabric 104 picks up messages coming in to the system from RICA 101. The Service Fabric 104 acts as the integration platform for the message translation system. It handles message processing, transformation, validation, and other value added services. The Service Fabric 104 does the work of the network by facilitating communication of messages in, through, and out of the system. The Service Fabric 104 uses Scribe 103 for persistent data storage and retrieval. Configuration is retrieved via Scribe 103 and managed via the Portal 102. Results and metrics may be observed via the Portal 102.

In a preferred embodiment, the Service Fabric 104 includes (1) actors in a framework including a "Warden" 105, a "Mouse" 106, and a "Guide" 107, and (2) a set of services 108. The Warden 105 is preferably a supervisor process that monitors the system 100 for receipt of new messages and upon receipt of new messages calls or creates a Mouse 106. The Warden 105 may create numerous Mice 106 for completing operations in accordance with the preferred system 100. If unprocessed messages are found, a Mouse 106 is created for each unprocessed message. The Mouse 106 is preferably a worker process or a supervisor process that receives or requests a service from the Guide 107. The Guide 107 is preferably a service for the worker process or the Mouse 106. Service Fabric 104 is preferably implemented in a multi-paradigm programming language, such as SCALA.

Service Fabric 104 may perform steps of: de-queuing messages from an arbitrary number of message queues, storing messages in their initial state, extracting Concepts from Messages, recognizing messages via extractions, routing messages via recognition output, and, optionally, based on the route, performing: custom extractions, Canonical transformation, data enrichment, database lookups, master-data validation and cross-referencing, content-based validations, business rules and alerting, reporting and analytics, populating messages through reversal of extraction, delivering messages to arbitrary number of endpoints, and relating messages via a correlation service.

Each message received by RICA 101 is processed by an independent mouse 106, which retrieves a Routing Slip that specifies Services 108 in a "route" to analyze, modify, validate, or deliver the message. These routes can be combined to enable a high level of flexibility and customizability. The process begins by obtaining configurations for the sender, receiver, and message type. If the configurations are found, a routing slip heuristic is applied, and an unambiguous match is searched for. If an unambiguous match is found, the routing slip is returned. If the configurations are not found, or no unambiguous match is found, troubleshooting is initiated to address the problem.

Figure 2:
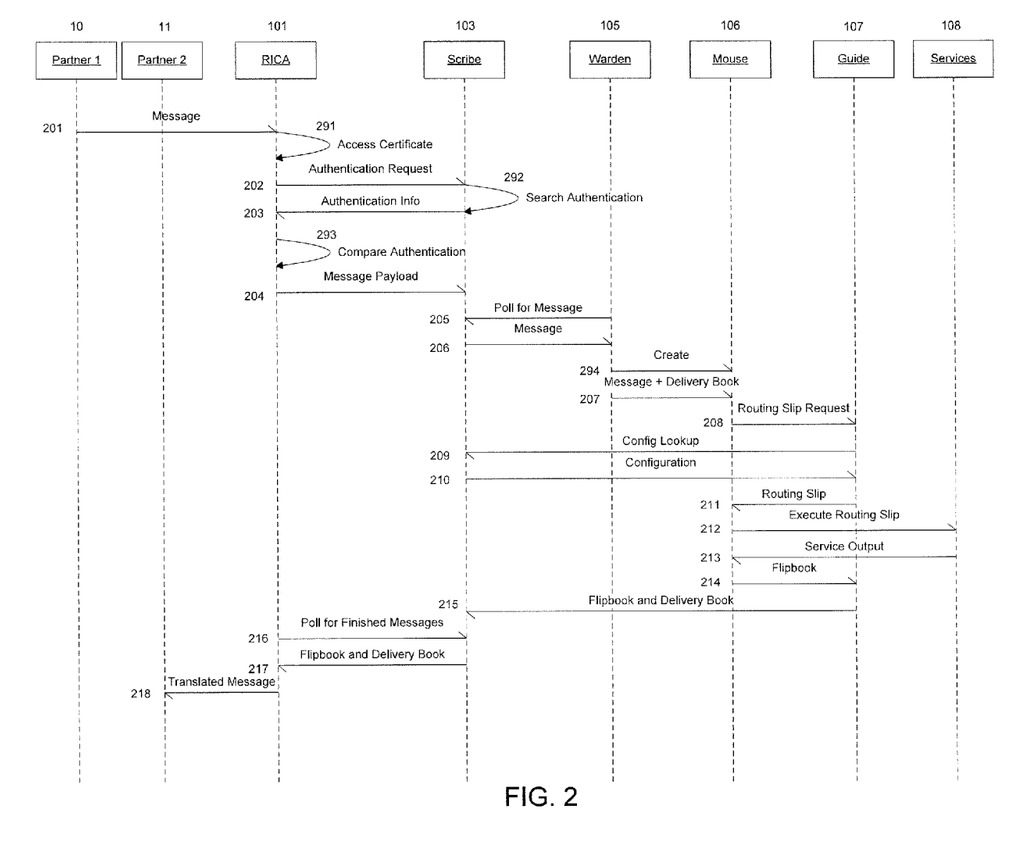
FIG. 2 is an exemplary sequence diagram of receipt, translation, and delivery of a message by the message translation system of FIG. 1.

FIG. 2 is a sequence diagram of an example of message translation by message translation system 100. In a preferred embodiment, at 201, an electronic message is directed from a sending trading partner 10 to RICA 101. At 291, RICA 101 accesses client certificate, when using hypertext transfer protocol secure ("HTTPS") formats, or login and password, when using virtual private network ("VPN"), and identifies a resource identifier, preferably a uniform resource indicator ("URI"), contained within the request.

At 202, RICA 101 requests authentication of the certificate or login/password and URI from Scribe 103. Scribe 103 searches for the authentication in its storage based on the configurations stored from the Portal 102 at 292. Scribe 103 sends authentication information to RICA 101 at 203.

At 293, RICA 101 compares the authentication information from Scribe 103 to the stored information, which was received in the initial direction of the message from the trading partner 10 to RICA 101, at 201. If authenticated or the information is confirmed, RICA 101 accepts the payload of the message itself into the system 100, stores the message as a new message in Scribe 103 and creates a delivery book that includes information about the trading partner 10, at 204.

The full message is preferably not allowed into the system 10 until the initial authorization is completed and confirmed. Accordingly, messages from unknown individuals or organizations are not received and/or stored in the system 10 until the identity of the trading partner 10 is confirmed or authorized. If the trading partner 10 is not authenticated, the payload or message is rejected and an error is sent to the exception-handling FIXME component 109.

At 205, Warden 105 is preferably configured to repeatedly poll Scribe 103 for new messages in need of processing. If a new message is found and the Scribe 103 notifies the Warden 105, at 206. The Warden 105 then creates a Mouse 106 and pulls the message and delivery book, at 206, and sends the message and the delivery book to the mouse 106, at 207, for processing of the message and delivery book by the Mouse 106 in the Service Fabric 104. The Mouse 106 requests a routing slip at 208 from the Guide 107 and creates a flipbook, which includes the delivery book. The Guide 107 sends a request, at 209, to the Scribe 103 for the configuration of the message based on the contents of the flipbook. The Scribe 103 sends the configuration to Guide 107 at 210. If no configuration is present or pre-existing, then the flipbook is sent to the error-handling FIXME process 109.

The Guide 107 then sends a routing slip that is based on the configuration received to the Mouse 106 at 211. The Mouse 106 appends the flipbook based on the process. The Mouse 106 executes the routing slip based on the Services 108 contained in the routing slip at 212. At 213, the Mouse 106 saves output from each service 108 to the flipbook. Once the routing slip and its indicated tasks are completed, the mouse 106 sends the flipbook to the Guide 107 and requests a new routing slip, at 214. The Guide 107 looks up the configuration to determine if additional Services 108 are needed. If additional services 108 are needed, the Guide 107 then sends a new routing slip to the mouse 106 at 211 and the mouse 106 executes the routing slip at 212. Once no routing slip is needed, the Guide 107 sends the flipbook and delivery book to the Scribe 103 detailing the receiver of the processed message at 215.

RICA 101 polls the Scribe 103 for any finished messages, as is represented by arrow 216. If a new message is found, RICA 101 pulls the flipbook and delivery book from Scribe 103 at 217. RICA 101 then sends the translated message contained in the flipbook to the receiving trading partner 11 based on the instructions contained in the delivery book at 218. If an error occurs, then the flipbook is sent to the FIXME 109.

Partners connecting to the message translation system are assigned a unique endpoint for message delivery. These endpoints can be provisioned dynamically at run-time and will enable loading and associating authentication information to an endpoint without having to restart or redeploy the message translation system. This allows more directed testing and analysis when there are issues connecting to the message translation system.

Partners have the ability to associate client certificates or username/password authentications with their endpoints. Certificates will be stored via Scribe 103 and associated by the authenticated user. Optionally, certificates may be generated for users that do not have the requisite knowledge. While authentication is generally discussed below with respect to certificates, it is to be understood that any other combination of uniquely identifying characteristics may be used, such as, for instance, a combination of IP address and recipient address.

As described above, a two-step authentication process is utilized in authenticating the Networked Partner in order to reduce the friction in troubleshooting connectivity issues associated with certificate-based connectivity methods. The message translation system may use information regarding authentication failures to assist in this troubleshooting. The two-step authentication is described briefly with respect to FIG. 3, then in detail with respect to FIG. 4.

Figure 3:
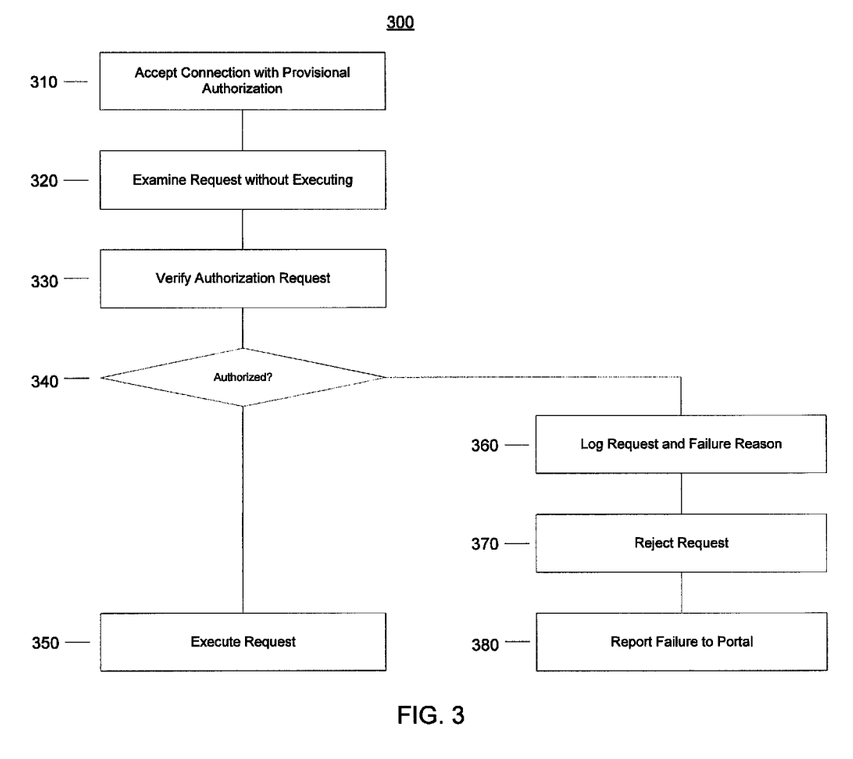
FIG. 3 is an exemplary flow chart of a two-step authorization method of the message translation system of FIG. 1.

FIG. 3 is a flow chart of a two-step authentication process 300. At 310, a connection from a trading partner is accepted with provisional authorization. The client certificate is used to establish a secure tunnel regardless of whether the certificate is known to the message translation system. At 320, the request is examined without being executed. In particular, the resource identifier associated with the request, preferably a URI, is determined. At 330, to verify the request, the user associated with the determined URI is identified. The certificate used for the request is then compared to the certificate for the user associated with the URI to determine whether the request is authorized. If, at 340, a match is confirmed, the request is executed at 350. If the certificates do not match, troubleshooting steps are performed. For instance, at 360, the request and the reason for failure are logged. At 370, the request is rejected. At 380, the failure is reported to Portal 102 for viewing by the user or a system operator. It is to be understood that the troubleshooting steps may vary based upon the reason for the failure, such as the specific details of the certificate that did not match.

Figure 4:
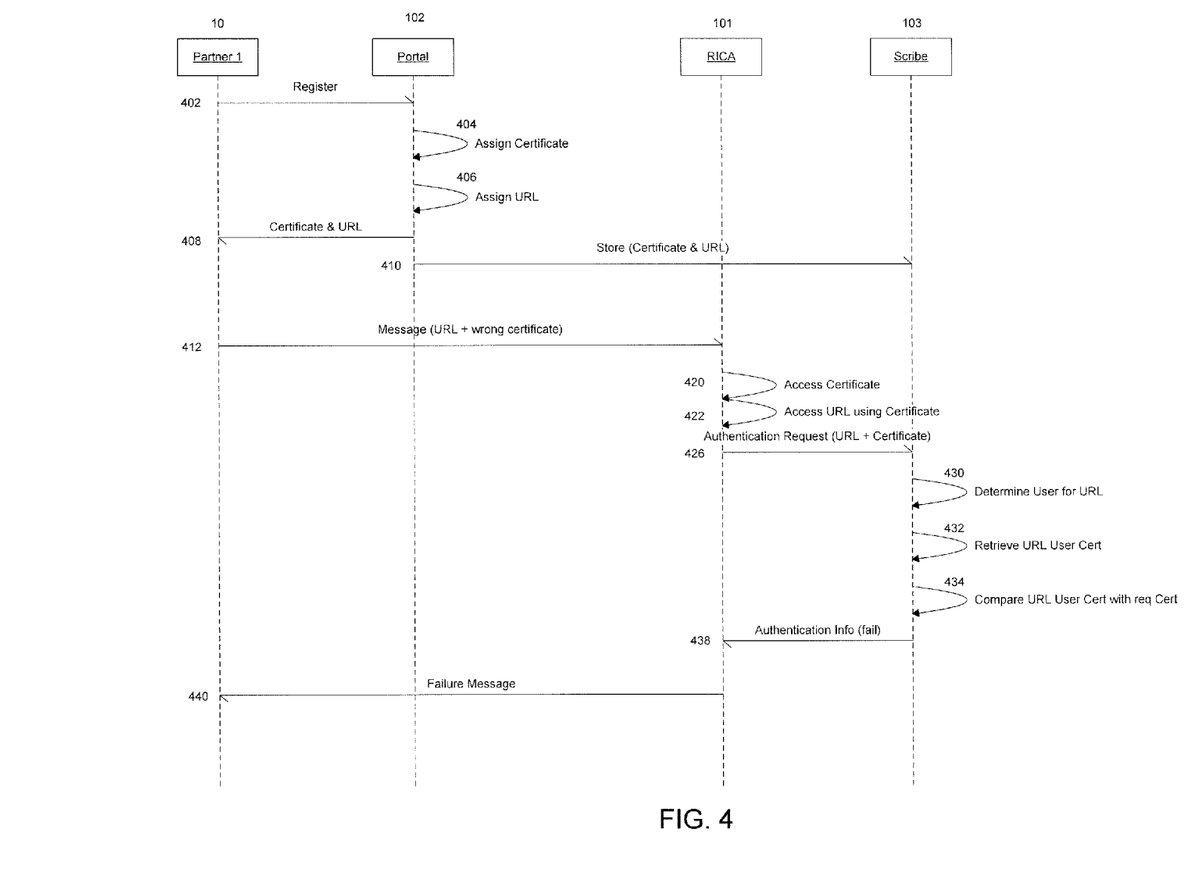
FIG. 4 is an exemplary sequence diagram of a two-step authentication in the message translation system of FIG. 1.

FIG. 4 is a sequence diagram of an example of system operation using certificates using an example of failed authentication. In the following example, it is to be understood that steps are shown to be associated with a particular component of the message translation system 100 for clarity, but may be performed by other components within the scope of the invention.

In a preferred embodiment, each valid user or group of users of the message translation system preforms a registration process 402, either indirectly or via Portal 102. At the time the user account is established, the user is preferably assigned a credential such as an encryption key or certificate at 404. The certificate is preferably an SSL or TLS client certificate. The user is also preferably assigned a unique resource identifier or address for accessing the system, such as a unique URI or root URI, at 406. The credential and resource identifier, preferably a certificate and URI, are provided to Partner 10 at 408. The certificate, or the public key from the certificate, and URI are also provided to Scribe 103 for storage for later use in authentication. In some cases, the Partner may provide its own certificate for use with the system.

At 412, Partner 10 attempts to connect to send a message. In this example, Partner 10 presents an incorrect certificate along with the correct assigned URI for the account encrypted within the request. The connection attempt of 412 may comprise a number of exchanges and may follow the general steps of, for instance, a client-authenticated TLS connection handshake process. The certificate may be in X.509 form and contain a public key for the client.

RICA 101 accesses the received credential at 420 to establish an SSL tunnel and access the URI within the request at 422. RICA 101 may use the certificate presented with the request without regard to whether it is valid for the system, using it merely to establish the tunnel and gain access to the URI associated with the request. In other embodiments, RICA 101 may require that the certificate at least be associated with the message translation system to perform any action.

At 426, RICA passes the URI and certificate to Scribe 103. Scribe 103 then identifies a user associated with the URI at 430. Scribe 103 retrieves the stored certificate associated with the identified user at 432 and compares the stored certificate associated with the user with the received certificate at 434. Through the comparison of certificates, the message translation system determines whether the received certificate is valid for the user associated with the requested URI. If the credential is not valid for the identified user associated with the URI, the system denies access to resources associated with the resource identifier, thereby causing the associated message to be refused. Scribe 103 then sends an indication of the failed authentication to RICA 101 at 438.

The presence of the valid resource identifier inside the request, however, may be an indication that an otherwise valid user is simply using the wrong credential. Thus, the RICA 101 may initiate troubleshooting and, for instance, at 440, communicate information to the user associated with the requested URI via a previously stored contact address to convey the fact that the received credential is not valid for the user associated with the resource identifier in the request. The user may then attempt the request again using the correct credential, or perhaps indicate that the connection request did not originate with that user.

Figure 5:
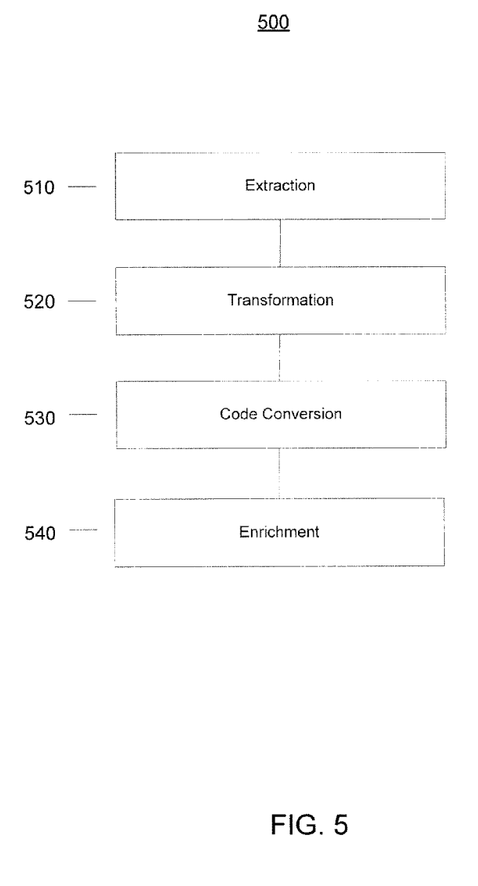
FIG. 5 is an exemplary flowchart of business data rationalization of the message translation system of FIG. 1.

FIG. 5 is a flow chart of a process 500 of Business Data Rationalization. Business Data Rationalization occurs in four steps, the first two steps, Extraction 510 and Transformation 520, modify the structure of the message, while the last two steps, Code Conversion 530 and Enrichment 540, deal with the content of a Business Message.

At 510, Extraction is performed. During the extraction phase the source data is converted from its native format into a data format understood by the system. This early representation of the message is still in the 'shape' of the inbound message, but the data elements have begun to be named.

At 520, Transformation is performed. Transformation allows changing the structure or shape of a message, as well as to change the 'extracted names' to 'canonical names' of Business Concepts. Business Concepts are descriptors relating to a transaction. They are preferably semantically meaningful names such as "Purchase Order Number" and "Delivery Date." Business concepts are the standard communication method for all services and applications of the message translation system. After data is decoupled from standard-based formatting all services can use the set of business concepts to determine how to operate on a message.

The semantically meaningful names may be further transformed into "universal business concepts." Universal business concepts are business concepts that allow association of additional parameters. Examples of universal business concepts include Reference, Date, Partner, Pricing, Contact, Quantity, Currency, Location, Instructions, Payment Terms, Transport Details, Packaging, Identifier, Equipment Details, Purchase Order Type, Unit of Measure, Country, Language Code, Product Information, and Transport Mode. The semantically meaningful name "buyer," for instance, may be transformed into the universal business concept "Partner (buyer)," where "buyer" is a parameter clarifying the type of "Partner." Services such as validation, business rules, applications, correlation, alerting, notification, extraction, code conversion, enrichment, master data validation and cross-referencing, reporting, dashboard, error handling and support, message routing and orchestration, and data enrichment may be performed on the universal business concepts.

At 530, Code Conversion is performed. Most business messages use codified values to represent commonly used data elements. Units of measure are typically chosen from an existing industry-standard set (e.g., UNEDIFACT Rec. 20, or ANSI X12 355). Code conversions are both standard and configurable, as typically a partner will support only a subset of a particular code list. The values found in the message are converted to those supported in the Canonical message.

At 540, if the message does not have the information necessary to satisfy the Services 108 of the routing slip, data enrichment is used to fill in the missing pieces. In order for all message transformations to be reversible, the side or portion of the message with a missing element is assigned a "virtual" or "remainder" element, which corresponds to the missing element. At runtime, the preferred system 100 uses a configuration to supply this information or initiates a fix or repair process by sending the message to the FIXME 109. This process is meant to be exemplary and not limiting and the system 100 may otherwise or alternatively address a message that has missing sides or portions, such as by requesting additional information from the trading partner 10 who sent the message, searching for appropriate information that may otherwise be available for access by the system 100 or otherwise similarly addressing the missing information.

The enrichment step causes the remaining actions to be taken that are required for a message to fit the Canonical form. This may include, for example, the conversion of a date format, or the addition of leading zeros. Sometimes, not all the required canonical data elements are included in an inbound message. The Enrichment step 540 may therefore provide the ability to "hard-code" values or programmatically insert calculated or inferred values. This step can also be used to add Business Data to the message, based on how it is configured in the system. For example, a location identifier can be used to load an address into the message, or a product ID may be used to load its product identifier.

Rationalization 500 is preferably configurable by partner and by message. These Rationalizations (e.g., extractors or Populators) are stored as configuration information and are searchable, reusable, reversible and reportable. Storing this information as a configuration allows creation of a learning system that will leverage existing data to simplify future Business Message Transformation. The gap between two connected partners can be analyzed, or the required data elements for a new partner connecting to an existing partner may be explicitly stated. Furthermore, specific sets of concept requirements may be defined by business processes, or applications that can be used at design time. Rationalization may also handle message formatting, code-lists, and other requirements specific to the origin/destination message.

The Rationalization 500 is also preferably reversible. That is, once a message has been transformed through the Rationalization process through the fabric 104, not only is the configuration process that the message has gone through stored, preferably so that it can be repeated, but the configuration can also be used by the Services 108 in reverse order to transform a message to its original format. The system 100 is preferably able to use a configuration in its native sequence, and in a reverse sequence, such as the mouse 106 executing the routing slips (arrow 212) and the mouse 106 saving the output (arrow 213), which helps to eliminate a significant amount of duplicated effort when working with an existing message set. Directionality of the message (inbound or outbound) is generally not a factor, as would be apparent to one having ordinary skill in the art based on a review of the present disclosure.

Business Concept requirements and validations can be managed at the edges of the system, but communicated through the processing layer. This will allow a user to decide which standards they will support at design-time, or to quickly analyze the impact of a new partner on boarding.

After the four phases of rationalization of process 500 are completed, the Canonical message is achieved. The Canonical is the message translation system's internal format of a Business Message, on which applications, and reporting and analysis services are built. The Canonical is flexible at a content level, and not limited as to what data it can contain. However, requirements are defined based on partner or process that can be enforced dynamically to ensure proper communication.

During on-boarding of each new trading partner, a reusable mapping, or configuration, for translation of messages from the trading partner message exchange format to the Canonical format may be created. Creating such mappings, however, may be time-consuming and costly. In some embodiments, therefore, the capability may be provided to accept messages without prior development of a mapping for a particular trading partner. Fields from incoming messages with known or determinable meanings may be mapped to business concepts on-the-fly. EDI messages, for instance, may be particularly amendable to being ingested without a specific trading partner onboarding process due to their known, predictable format. In some cases, only a subset of the fields of a message with known meanings may be mapped. If the fields that can be mapped are sufficient for conveying key aspects of a message, such as key terms of a purchase order, interaction with the trading partner may continue without the need for onboarding.

The Canonical may preferably be represented in the form of an XML file on disk. However, in some embodiments, operational efficiency may be achieved by bypassing the steps of writing an XML file to storage and reading it for subsequent delivery. Instead, the intermediate format may be held in-memory.

As the volume of message handling increases over time, it becomes increasingly difficult to know what the system was doing exactly during normal operation, and especially when an error occurs. Therefore, the message translation system is designed to provide knowledge regarding the operation of the system while it is running. Data structures, such as the flipbook, that are self-documenting and immutable are used to record all actions. They cannot be changed once they are created.

Using a flipbook like data structure, all actions initiated regarding an incoming message are recorded on a separate page of the flipbook. Each page of a particular flipbook represents a state change during message processing of that message. As a result, when processing for a specific message fails, it is always clear what happened and where the processing stopped or failed so that corrective actions may be taken.

Authorized users are provided the ability to fix problems while the full context of a failure is still known. The FIXME process 109 implements a path to resolve normal system issues that are due to configuration errors. This makes sure that most errors that can occur will be quickly detected and fixed. All failed messages and their flipbooks are registered with the FIXME 109. An authorized user can then inspect a flipbook in order to decide how to resolve an issue. If the failure is due to an erroneous configuration, the user can change this configuration while the system is running. Preferably, the new configurations can then be tested on the failed message in simulation mode without side effect. Once the erroneous setup has been fixed the original message can be reprocessed using the new configuration.

As described above, a number of situations may lead to the message translation system being unable to completely translate a particular message. For instance, the system a) may not know the meaning of an incoming piece of a message, b) may know the meaning of an incoming piece of a message but determine that that portion of the message is invalid, c) may require a portion of an incoming message for proper translation, but determine that that portion of the message is not present.

Certain of these problems simply require correction and re-sending of the message. Incoming message data that is absolutely required and missing, for instance, may require intervention from the sender. Similarly, data determined to be malformed or otherwise outside of acceptable ranges may also require the incoming message to be corrected, or a corrected message to be transmitted.

Other problems, however, may be cured, both for the present message and future messages, by adapting the configuration set or sets for handling those types of messages. That is, by fixing the underlying cause of the translation issue, the system is thereby adapted to handle those types of messages. The message that produced the error may then be reprocessed using the corrected configuration. While the description may refer to "errors," it is to be understood that the processes described are actually an integral part of the training and configuration of the translation system. By detecting translation issues and modifying system data, the system is adapted to handle a wider variety of message translation tasks.

In a preferred embodiment, a Fix Me process 109 is a trans-contextual process that provides resolutions via modules which include a diagnosis module (not shown), a remedy module (not shown), and a teaching module (not shown). The diagnosis module (not shown) is preferably configured to recognize a way that a supplied context is wrong for a supplied message and exception or where in the various processes of the message translation system 100 the message failed and potential fixes the may be applied to the message, such as fixes that are similar to those applied to similar messages that failed at similar stages or in similar contexts in the system 100. The remedy module (not shown) is preferably for prescribing remedies. The remedy module (not shown) may also perform the operations of changing of a context and possibly the changing of a message, such as changing values in the message, message destination, timing or other related message content or routing. The teaching module (not shown) is preferably for providing additional instructions and explanations for a remedy prescribed by the remedy module (not shown). The teaching module (not shown) may also provide such instructions and explanations as feedback to the overall Fix Me process 109 in an effort to improve context recognition and resolution suggestions.

The FixMe process 109 may implement a path to resolve system issues that may be due to the following non-exhaustive list of process steps: (1) errors that occur during authentication of a customer to the RICA 101 component when receiving inbound messages; (2) errors that occur during the actual transfer of message contents from the customer to the RICA 101 component after authentication; (3) configuration errors while processing messages in the Service Fabric 104; (4) processing errors while processing messages in one of the services of the Service Fabric 104; (5) errors that occur during the sending of outbound messages from the RICA component to the customer; and (6) relates failures or errors that occur as the messages are processed through the system 100.

The FixMe process 109 defines several services that may suggest one or more resolutions for business process messages. The FixMe process 109 may recognize the context of a business process message, identify when there is an error in the context, and may suggest changes to the message and context to correct the error. The FixMe process 109 may also determine that an error or failure is not appropriate for automated manipulation and/or repair and may determine a method for routing the failed or corrupted message to a trading partner messaging client 10, 11 or other actor in the system 100.

The importance and subtleties that arise when dealing with the context of a message may be explained by making an analogy to a phenomenon that can occur when a customer returns an item to a store because it doesn't meet expectations. In this particular analogy, the storeowner enters into a discussion with the customer about the validity of returning the item. After some discussion, the customer gets annoyed and says, "This is not OK". The customer (the sender of the message "this is not OK") is referring to the way that the storeowner is handling his return of the item. The store owner (the receiver of the message "this is not OK") interprets the message as relating to the quality of the returned product, and the discussion escalates. Resolution in this instance would be recognizing that the context of the message was related to the overall handling and not the context of the quality of the product (through a diagnosis). Then suggesting changing the context so that the message can be correctly interpreted (resolution or remedy suggestion). Finally, learning that the message can be interpreted in two contexts and picking the right one.

In a somewhat similar fashion, the FixMe process 109 may perform one or more operations on the message and its context using the above discussed actors (e.g., diagnosis module (not shown), remedy module (not shown), and teaching module (not shown)). Many examples exist in which the there may be errors in the messages and a change in context may resolve the error, some preferred or common examples are listed below:

1) A message may be submitted to a unique customer endpoint where the authentication does not match the expected communication protocol for that unique endpoint. The FixMe process 109 preferably recognizes the context created for authentication and protocol and sees that the customer has a different unique endpoint where the protocol would match. As a remedy, the FixMe process 109 may capture the protocol and change the message submission context by transforming the protocol after successful authentication. The FixMe process 109 preferably relies on a history of message failures that may relate to the particular customer or recipient associated with the particular message that is stored in the "History of Exceptions and Contexts" module or database. The FixMe process 109 also preferably relies on the history of messages and their flow through the system 100 represented by the flipbooks created by the flow of previous messages through the system 100. In the preferred embodiment, all of the flipbooks created as the result of messages flowing through the system 100 are stored in the "History of Exceptions and Contexts" module or database for reference by the FixMe process 109 to determine potential fixes via analysis by the diagnosis module (not shown), the remedy module (not shown) and the teaching module (not shown). The FixMe process 109 may then report the correct protocol/endpoint combination back to the customer.

2) A message in the Fabric has an incomplete processing configuration

The FixMe process 109 may recognize that the customer has an incomplete configuration setup for the message, but that it has a network configuration for related messages. The network configuration for related messages is preferably stored in the "History of Exceptions and Contexts" module or database as the result of numerous previous messages flowing through the system 100. Executing the business processing in the context of one of the existing configuration may be successful. As a remedy, the FixMe process 109 may suggest network configurations that may lead to a successful processing of the business process message.

3) A message in the Service Fabric has no processing configuration

The FixMe process 109 may recognize that the customer has no configuration setup for the message, but that it has a network configuration for related messages. Executing the business processing in the context of one of the existing configuration may be successful. As a remedy, the FixMe process 109 may suggest network configurations that may lead to a successful processing of the business message.

4) An outbound message fails to be delivered to the customer because RICA cannot establish a valid connection to the customer (outbound)

The FixMe process 109 may recognize that RICA 101 cannot deliver the message in the context of the protocol, message type and authentication methods supported by the customer for accepting messages from RICA. As a remedy, the FixMe process 109 may i) suggest a resend to test physical connectivity within the same context of the protocol, message type and authentication methods; and/or ii) suggest a different context for delivering the outbound message, in an automated fashion that can be subscribed as a request by the partner 10, 11.

5) Outbound message fails delivery (for example, partner's processors are out of service for maintenance)

The FixMe process 109 may cause future messages to wait in a "paused" state (to prevent future errors/maintain order of messages) until the original message is delivered successfully. As a remedy, the FixMe process 109 and/or RICA can 'ping' the server until the partner's 10, 11 processors are back on-line or again accepting messages, and then auto-resolve the issue when the partner's 10, 11 processors are again able to receive messages. A non-limiting example of execution mechanisms may include: a. Message fails delivery; b. Connection goes into 'down' state, messages paused; c. Rica pings for connection back up; d. Repeat 'c' until back up; and e. Redeliver all paused messages in order.

Resolution processes, as discussed hereinthroughout, may be simplified through one or more teaching mechanisms. Such simplification may be taught by the teaching module (not shown), wherein the teaching module (not shown) is responsible for storing such knowledge and making it available to enhance the overall knowhow of the system 100. For example, the system 100 can learn that a particular type of failure (e.g., xref-missing for vendor code XXX) may require a resolution from a specific agent. Through the FixMe process 109 (via the teaching module (not shown), for example), a user can be directed to the specific configuration to modify, and then reprocess the message that failed as a result of saving an update. A non-limiting example of such resolution steps is as follows:

1—message missing vendor code fails;
2—email client, indicating no vendor code for partner XXX, click here to resolve;
3—client clicks link, edits and saves configuration; and
4—system 100 reprocesses all messages that were waiting on the vendor code for partner XXX.

By eliminating the need to do data preparation and processing, the preferred system 100 and FixMe process 109 enables rapid development of messaging applications to support, automate, or optimize any sort of process. While in the preferred embodiment, the message translation system 100 is applied to automating and optimizing Supply Chain communications, it may similarly be used in a variety of other applications requiring automating and integrating the exchange of information, such as in the medical and regulatory fields.

As would be understood by one skilled in the art, the message translation system may be implemented using a variety of hardware configurations. A single computer may provide all functions, or functions may be allocated amongst multiple machines, physical or virtual. For instance, data storage may be allocated to a specific machine or group of machines running database software. Portal 102 may utilize one or more separate web servers or load balancers. Each computer in the system 100 may comprise a process for executed stored program code for performing the processes and methods described herein. Each computer may also comprise one or more network interfaces for communicating information as described. Each computer may also comprise one or more memories and storage devices for storing program code and data.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present disclosure.

We claim:

1. A method of adapting a message translation system comprising:

receiving, by a computing system associated with the message translation system, a message from a sender;

selecting, by the computing system, a configuration set from a stored plurality of configuration sets based on at least two of: information regarding the sender of the message, information regarding a recipient of the message, and information regarding the message type, selecting the configuration set includes:

determining, by the computing system, identifying information for the configuration set associated with the at least two of information regarding the sender, the information regarding the recipient and the message type; and accessing, by the computing system, the configuration set based on the identifying information;

processing, by the computing system, the message in accordance with information derived from the selected configuration set;

identifying, by the computing system, an issue with the processing of the message in accordance with information derived from the selected configuration set, the issue being selected from the group consisting of: failed delivery of the message, failed authentication of a trading partner, incomplete configuration information associated with the message, absence of mapping in the configuration set for processing the message, absence of a cross-reference in the configuration set for processing the message, connectivity issues, configuration errors, errors delivering the message to the receiver, errors during data enrichment, missing information in the message, invalid message structure, and failure of one or more resources of a computing system associated with the recipient;

determining, by the computing system, a resolution for the identified issue with the processing of the message in accordance with information derived from the selected configuration set, wherein determining the resolution includes comparing the issue to a previous issue identified by the translation system;

updating, by the computing system, the selected configuration set based upon the determined resolution, by one of modifying data within the configuration set and creating a new configuration set with the same identifying data as the selected configuration set;

reprocessing, by the computing system, the message in accordance with information derived from the updated configuration set; and transmitting, by the computing system, the message reprocessed in accordance with information derived from the updated configuration set to the recipient.

2. The method of claim 1 wherein each configuration set of the plurality of configuration sets comprises identifying information and a version identifier.

3. The method of claim 1 wherein each configuration set of the plurality of configuration sets comprises at least one of a cross-reference table, a unit-of-measure conversion table, and a mapping table.

4. The method of claim 1 wherein the sender is a supply chain partner of the recipient and the message is received from a computing system of the sender.

5. The method of claim 1 wherein the information derived from the selected configuration set or updated configuration set is a routing slip.

6. The method of claim 1, further comprising:
determining, by the computing system, a recipient and a message type for the received message.

7. The method of claim 1 wherein the proposed resolution comprises the addition of an identity mapping to the configuration set.

8. The method of claim 1 wherein the proposed resolution comprises the addition of an equivalence mapping to the configuration set.

9. The method of claim 1 wherein the identified issue is identified by a validation service of the message translation system.

10. The method of claim 1 wherein updating the selected configuration set based upon the determined resolution comprises at least one of: adding a cross-reference to the configuration set, adding a unit-of-measure conversion to the configuration set, or adding a mapping to the configuration set.

11. The method of claim 1 wherein the predetermined reference output associated with the set of messages comprises output generated by processing the set of messages in accordance with information derived from the selected configuration set or a prior version of the selected configuration set.

12. The method of claim 1 wherein determining a resolution for the identified issue with the processing of the message in accordance with information derived from the selected configuration set comprises:
presenting, to a user, one or more proposed resolutions; and
receiving input from a user regarding a selected resolution.

13. The method of claim 12 wherein the one or more proposed resolutions are based upon resolutions selected in response to previous issues with at least one configuration set with similarity to the selected configuration set.

14. The method of claim 13 wherein the similarity is association with at least one of a common sender, recipient, or message type.

15. A system for adapting a message translation system, comprising:
one or more computing devices configured to:
receive a message from a sender;
select a configuration set from a stored plurality of configuration sets based on at least two of: information regarding the sender of the message, information regarding a recipient of the message, and information regarding the message type, selecting the configuration set includes:
determining, by the computing system, identifying information for the configuration set associated with the at least two of information regarding the sender, the information regarding the recipient and the message type; and
accessing, by the computing system, the configuration set based on the identifying information;
process the message in accordance with information derived from the selected configuration set;
identify an issue with the processing of the message in accordance with information derived from the selected configuration set, the issue being selected from the group consisting of: failed delivery of the message, failed authentication of a trading partner related to the message, incomplete configuration information associated with the message, missing information in the message, invalid message structure, connectivity issues, errors during data enrichment, absence of a cross-reference in the configuration set for processing the message, absence of mapping in the configuration set for processing the message, and failure of one or more resources of a computing system associated with the recipient;
determine a resolution for the identified issue with the processing of the message in accordance with information derived from the selected configuration set;
update the selected configuration set based upon the determined resolution, by one of modifying data within the configuration set and creating a new configuration set with the same identifying data as the selected configuration set, wherein determining the resolution includes comparing the issue to a previous issue identified by the translation system;
reprocess the message in accordance with information derived from the updated configuration set; and
transmit the message reprocessed in accordance with information derived from the updated configuration set to the recipient.

\* \* \* \* \*